United States Patent [19]

Tibbs

[11] 4,300,287
[45] Nov. 17, 1981

[54] CUTTING TOOL

[76] Inventor: Larry T. Tibbs, 1827 E. Lincoln Hwy., DeKalb, Ill. 60115

[21] Appl. No.: 185,328

[22] Filed: Sep. 8, 1980

[51] Int. Cl.³ .............................................. B26B 29/00
[52] U.S. Cl. ..................................... 30/289; 30/90.4; 30/277; 30/294
[58] Field of Search ................. 30/289, 294, 277, 314, 30/315, 317, 90.4

[56] References Cited

U.S. PATENT DOCUMENTS

| | | | |
|---|---|---|---|
| 1,114,903 | 10/1914 | Moore | 30/294 |
| 1,153,286 | 9/1915 | Cahill | 30/90.6 |
| 1,418,125 | 5/1922 | Carroll | 30/294 |
| 2,199,380 | 5/1940 | Walraven | 30/294 |
| 2,203,158 | 6/1940 | Klein | 30/168 |
| 2,521,245 | 9/1950 | Murphy | 30/289 |
| 3,056,202 | 10/1962 | Chandler | 30/277 |
| 3,191,909 | 6/1965 | Reischl | 254/104 |
| 3,208,134 | 9/1965 | Krewson, Jr. | 29/401 |
| 3,577,638 | 5/1971 | Chandler | 30/277 |
| 3,673,686 | 7/1972 | Benedict | 30/294 |

Primary Examiner—Stephen G. Kunin
Assistant Examiner—J. T. Zatarga
Attorney, Agent, or Firm—Kinzer, Plyer, Dorn & McEachran

[57] ABSTRACT

A tool for use in removing the outer sheet metal skin of an automobile door. The tool includes an elongated body having a generally longitudinal axis. A shank is located at one end of the body for connection to a reciprocating apparatus such as an air hammer. A cutting portion is located at the opposite end of the elongated body. The cutting portion of the tool includes a somewhat flattened area extending from the end of the tool. A pair of fingers are located at the cutting end of the tool and project outwardly from the flattened area side of the body. The fingers extend generally at right angles to the longitudinal axis of the body and are spaced apart a sufficient distance to straddle the outer edge of an automobile door to guide the tool during cutting. A narrow cutting tooth is formed on the flattened area of the cutting portion of the tool and is positioned to engage the edge of the automobile door when the fingers are straddling the edge. The cutting tool projects below the flattened area a distance approximately equal to the thickness of the sheet metal forming the outer skin of the automobile door. A slot located adjacent the cutting tooth extends through the body to permit passage of scrap cut from the sheet metal skin. The cutting portion of the tool is bent relative to the longitudinal axis of the tool body. A guide surface is formed between the fingers to engage the edge of the door and properly align the cutting tooth relative thereto. The cutting tooth is substantially as wide as the slot located adjacent the cutting tooth.

3 Claims, 4 Drawing Figures

CUTTING TOOL

BACKGROUND AND SUMMARY OF THE INVENTION

The door of a modern automobile has an outer skin formed of a sheet of metal. The edges of this sheet of metal are reversely folded around an inner sheet which has been molded into a structural configuration. The reversely folded portion of the front sheet is spot welded to the inner molded sheet of metal to form a composite door structure. When it is necessary to remove the outer sheet of metal from a door to repair damage thereto, it has been extremely difficult to cut the seam formed between the inner and outer sheets of metal without damaging the inner molded metal sheet. Removal of this seam has required grinding of the reversely folded portion of the front metal sheet, an expensive and time consuming operation.

Therefore, an object of this invention is a tool which permits rapid removal of the outer sheet metal skin of an automobile door without damaging the inner molded sheet metal member.

Another object of this invention is a cutting tool for removing the outer sheet metal skin of an automobile door which can be used on a conventional pneumatic hammer.

Another object of this invention is a cutting tool for removing the outer sheet metal skin of an automobile door which can be guided along the cutting path without slippage.

Another object of this invention is a cutting tool for removing the outer sheet metal skin of an automobile door which can easily be positioned to cut at the required depth.

Other objects may be found in the following specification, claims and drawings.

BRIEF DESCRIPTION OF THE DRAWINGS

The invention is illustrated more or less diagrammatically in the following drawings wherein.

DESCRIPTION OF THE PREFERRED EMBODIMENT

Figure 1:
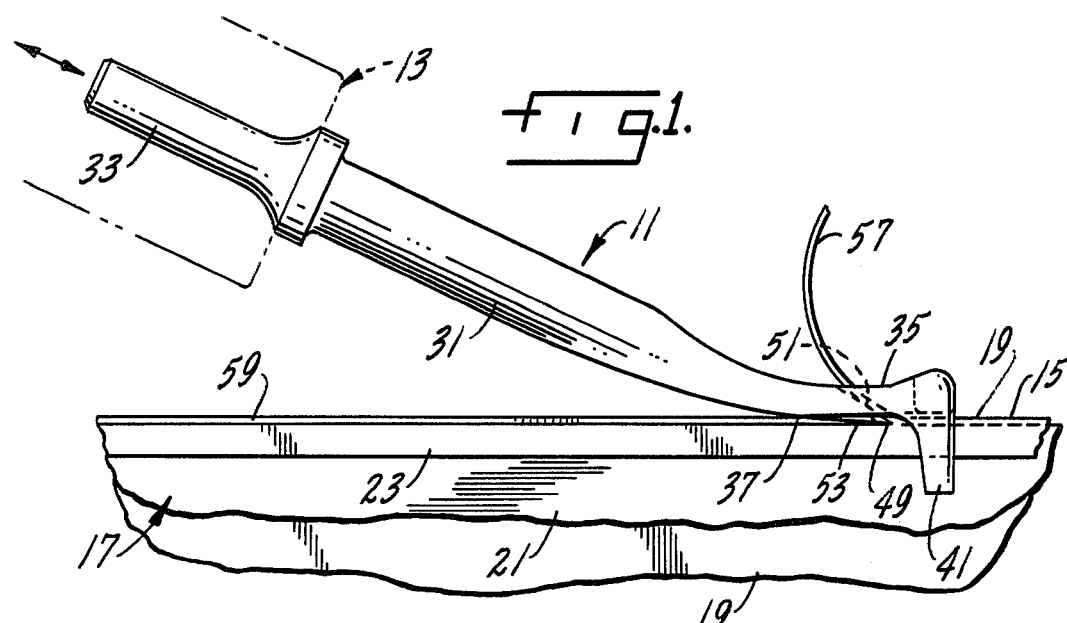
FIG. 1 is a partial elevational view showing the cutting tool of this invention in use removing the outer sheet metal skin of an automotive door with parts broken away and others shown in phantom.
Figure 2:
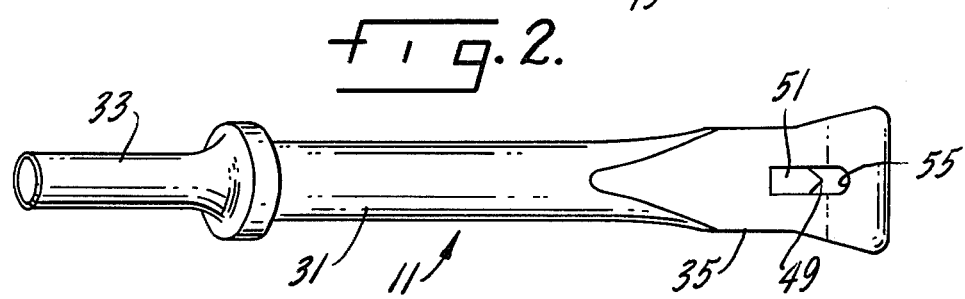
FIG. 2 is a top plan view of the cutting tool of this invention.
Figure 3:
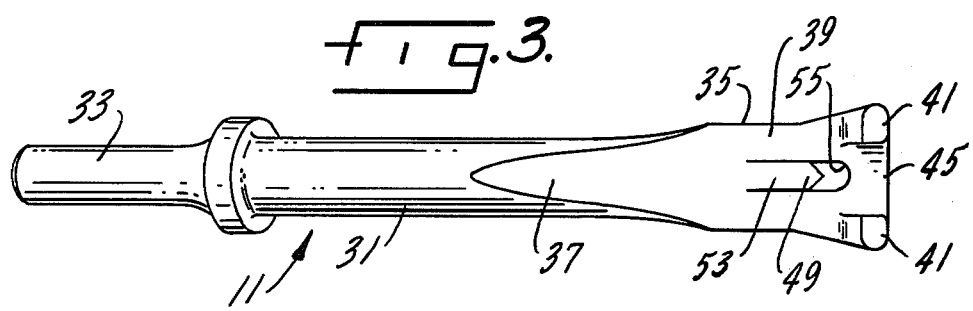
FIG. 3 is a bottom plan view of the cutting tool of this invention.

FIG. 1 of the drawings shows the tool 11 of this invention connected to a reciprocating hammer 13 shown in phantom lines. The reciprocating hammer can either be a conventional pneumatic hammer or an electric hammer. The tool is shown engaging an edge 15 of an automobile door 17. Conventionally, an automobile door includes a sheet of metal 19 which forms the outer skin of the door and a molded inner metal sheet 21. The outer sheet of metal 19 is reversely folded over the edge of the inner metal sheet 21 to form a seam 23. The seam 23 is spot welded to the inner metal sheet 21 to seal the seam. When it is necessary to remove the outer sheet metal 19 forming the skin of the door, for example, when needed to repair collision damage, it has been necessary to grind off the inner seam 23 in order to separate the outer sheet metal skin from the molded inner metal sheet. This has proven to be time consuming and therefore expensive.

Figure 4:
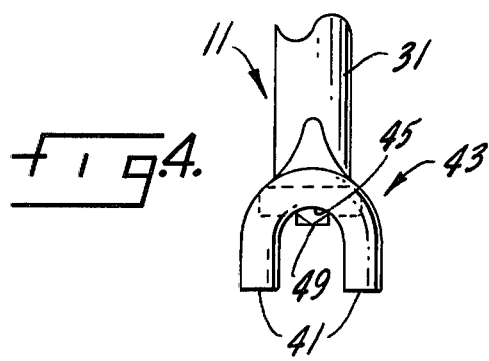
FIG. 4 is a front elevational view with a portion of the tool body broken away.

The tool 11 of this invention includes an elongated body 31 of generally circular cross section having a shank 33 at one end thereof. The shank 33 is adapted to connect to the reciprocating hammer 13. A cutting portion 35 is located at the opposite end of the elongated body 31 from the shank. In this embodiment of the tool, the cutting portion 35 is bent relative to the longitudinal axis of the elongated body to permit the reciprocating tool to be positioned away from the edge 15 of the automobile door 17 when the tool is being used. The convex side 37 of the bend is provided with a flattened area 39 which is intended to contact the edge 15 of the door in the manner shown in FIG. 1 of the drawings. A pair of fingers 41 are formed on this flattened portion at the end of the tool with the fingers extending generally at right angles to the longitudinal axis of the elongated body 31. The fingers are spaced apart from each other a sufficient distance to enable them to straddle the edge 15 of the door to guide the tool during cutting. The fingers in effect form a U-shaped member 43 (FIG. 4) at the cutting end of the tool with the bight portion 45 of the U-shaped member functioning as a stop to limit the angle of inclination of the tool relative to the door edge.

A narrow cutting tooth 49 is formed on the flattened area 39 of the cutting portion 35 of the tool and is positioned to engage the edge 15 of the automobile door when the tool is positioned with the fingers straddling the edge. The cutting tooth is proportioned so that it projects below the flattened area a distance approximately equal to the thickness of the sheet metal forming the outer skin 19 of the automobile door. The cutting tooth has an upper sloping surface 51 and a lower sloping surface 53 which blends into the flattened area 39 of the cutting tool. A slot 55 extends through the cutting tool just forward of the cutting tooth to permit passage of scraps 57 cut from the sheet metal in the manner shown in FIG. 1 of the drawings.

Operation of the tool 11 of this invention in a reciprocating mechanism such as a pneumatic hammer 13 cuts a piece of scrap 57 from the outer sheet metal 19 where it curves around the outer edge of the inner metal sheet 21. This cut 59 is formed outwardly of the spot welds holding the two sheets of metal together. When the cut is completed, it is possible to pry the outer sheet 19 away from the door.

I claim:

1. A tool for use in removing the outer sheet metal skin of an automobile door by cutting through the outer skin where it is reversely folded over the edge of the door, said tool including:

an elongated body having a front end and a rear end,
a shank at the rear end of the elongated body for connection to a reciprocating hammer, and a cutting portion at the front end of the elongated body,
said cutting portion of said tool including a flattened area extending from the front end of the body, a pair of stubs located at the front end of the body and on the flattened area side of the body, said stubs extending substantially at right angles to the flattened area of the body and being spaced apart to straddle the outer edge of an automobile door to guide the tool during cutting, a cutting tooth formed on the flattened area of said cutting portion of the tool and aligned between said stubs, said cutting tooth projecting below said flattened area a distance substantially equal to the thickness of the sheet metal forming the outer skin of said automobile door, a slot formed adjacent said cutting tooth and extending through said body to permit passage of scrap cut from the sheet metal skin, and a guide surface formed between the stubs and located forward of the cutting tooth to align the cutting tooth to prevent the cutting tooth from cutting into the edge of the automobile door a distance substantially greater than the thickness of the sheet metal forming the outer skin of the automobile door.

2. The tool of claim 1 in which the cutting portion of the tool is bent relative to the elongated body.

3. The tool of claim 1 in which the cutting tooth is substantially as wide as the slot formed adjacent the cutting tooth.

* * * * *